United States Patent
Vikberg et al.

(10) Patent No.: US 8,391,241 B2
(45) Date of Patent: Mar. 5, 2013

(54) INTER-SYSTEM HANDOFF USING CIRCUIT SWITCHED BEARERS FOR SERVING GENERAL PACKET RADIO SERVICE SUPPORT NODES

(75) Inventors: Jari Vikberg, Järna (SE); Magnus Hallenstål, Täby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 368 days.

(21) Appl. No.: 12/680,300

(22) PCT Filed: Oct. 4, 2007

(86) PCT No.: PCT/IB2007/002951
§ 371 (c)(1),
(2), (4) Date: Apr. 30, 2010

(87) PCT Pub. No.: WO2009/044222
PCT Pub. Date: Apr. 9, 2009

(65) Prior Publication Data
US 2010/0309886 A1    Dec. 9, 2010

(51) Int. Cl.
*H04W 36/00*    (2009.01)
*H04W 4/00*    (2009.01)
*H04L 12/66*    (2006.01)
*H04B 7/00*    (2006.01)

(52) U.S. Cl. ..... 370/331; 370/328; 370/332; 455/435.1; 455/436; 455/450

(58) Field of Classification Search ................. 370/252, 370/328, 331–334; 455/9, 432.1–444
See application file for complete search history.

(56) References Cited

U.S. PATENT DOCUMENTS

| 2005/0195766 | A1* | 9/2005 | Nasielski et al. | 370/331 |
|---|---|---|---|---|
| 2007/0060167 | A1 | 3/2007 | Damnjanovic | |
| 2008/0184032 | A1* | 7/2008 | Li et al. | 713/171 |
| 2008/0192697 | A1* | 8/2008 | Shaheen | 370/331 |
| 2008/0214190 | A1* | 9/2008 | Aalto | 455/435.1 |

FOREIGN PATENT DOCUMENTS

| DE | 102005035723 B3 | 2/2007 |
|---|---|---|
| GB | 2430120 A | 3/2007 |
| WO | 01/52566 A | 7/2001 |
| WO | 2007/103496 A | 9/2007 |

OTHER PUBLICATIONS

International Preliminary Report on Patentability for PCT/IB2007/002951 dated Apr. 15, 2010.
3GPP TR 23.882 v 1.9.0, "Technical Specification Group Services and System Aspects; 3GPP System Architecture Evolution: Report on technical options and conclusions (Release 7)", Mar. 1, 2007, pp. 1-184.
International Search Report from International Application No. PCT/IB2007/002951 dated Oct. 13, 2008.
Chinese Office Action in corresponding Chinese Application No. 200780100943.X dated Sep. 10, 2012.
3rd Generation Partnership Project (3GPP); 3rd Generation Partnership Project; Technical Specification Group Services and System Aspects; 3 GPP System Architecture Evolution; Repot on Technical Options and Conclusions (Release 7); TR 23.882 V1.9.0; Mar. 1, 2007; pp. 1-184; Valbonne, France.

* cited by examiner

*Primary Examiner* — Afsar M. Qureshi
(74) *Attorney, Agent, or Firm* — Potomac Patent Group PLLC

(57) ABSTRACT

Systems and methods according to these exemplary embodiments provide for methods and systems for handling off user equipment between a second generation (2G) radio access network (RAN), e.g., a Global System for Mobile communications (GSM) network, and a long term evolution (LTE) network.

30 Claims, 15 Drawing Sheets

| FRAME TYPE | MODE INDICATION | MODE REQUEST | FRAME CONTENT (AMR MODE, COMFORT NOISE, OR OTHER) |
|---|---|---|---|
| 0 | 0 | 0 | AMR 4,75 kbit/s |
| 1 | 1 | 1 | AMR 5,15 kbit/s |
| 2 | 2 | 2 | AMR 5,90 kbit/s |
| 3 | 3 | 3 | AMR 6,70 kbit/s (PDC-EFR) |
| 4 | 4 | 4 | AMR 7,40 kbit/s (TDMA-EFR) |
| 5 | 5 | 5 | AMR 7,95 kbit/s |
| 6 | 6 | 6 | AMR 10,2 kbit/s |
| 7 | 7 | 7 | AMR 12,2 kbit/s (GSM-EFR) |
| 8 | - | - | AMR SID |
| 9 | - | - | GSM-EFR SID |
| 10 | - | - | TDMA-EFR SID |
| 11 | - | - | PDC-EFR SID |
| 12-14 | - | - | For future use |
| 15 | - | - | No Data (No transmission/No reception) |

INTER-SYSTEM HANDOFF USING CIRCUIT SWITCHED BEARERS FOR SERVING GENERAL PACKET RADIO SERVICE SUPPORT NODES

RELATED APPLICATIONS

This application claims priority and benefit from International Application No. PCT/IB2007/002951, filed Oct. 4, 2007, the entire teaching of which is incorporated herein by reference.

TECHNICAL FIELD

The present invention relates generally to telecommunications systems and, in particular, to methods and systems for performing inter-system handoffs.

BACKGROUND

Radio communication networks were originally developed primarily to provide voice services over circuit-switched networks. The introduction of packet-switched bearers in, for example, the so-called 2.5G and 3G networks enabled network operators to provide data services as well as voice services. Eventually network architecture will likely evolve toward all Internet Protocol (IP) networks which provide both voice and data services. However, network operators have a substantial investment in existing infrastructure and would, therefore, typically prefer to migrate gradually to all-IP network architectures to allow them to extract sufficient value from their investment in existing infrastructures. In order to provide the capabilities needed to support next generation radio communication applications, while at the same time using legacy infrastructure, network operators will deploy hybrid networks wherein a next generation radio communication system is overlaid onto an existing circuit-switched or packet-switched network as a first step in the transition to an all IP-based network.

One example of such a hybrid network involves an existing second generation (2G) radio communication system, such as the Global System for Mobile communication (GSM), onto which a next generation "long term evolution" (LTE)/"system architecture evolution" (SAE) system is overlaid. As will be appreciated by those skilled in the art, GSM systems have been modified and updated over time. For example, GSM release 1997 added packet data capabilities using General Packet Radio Service (GPRS) and GSM release 1999 introduced higher speed data transmissions through a system called Enhanced Data Rates for GSM Evolution (EDGE). Although not yet standardized, LTE systems will ultimately be designed in accordance with a new version of the UMTS standards, see, e.g., 3GPP TR 25.913 available online at www.3gpp.org. Target performance goals for LTE systems currently include, for example, support for 200 active calls per 5 MHz cell and less than 5 ms latency for small IP packets.

When an LTE/SAE system is overlaid onto or next to a GSM system, various types of inter-system interoperability will become desirable, one of which is handoff or handover. Inter-system handoff refers to, for example, the process whereby a mobile unit, e.g., a cellular telephone, wireless PDA or laptop, which is currently being supported by a first radio communication system is transferred to the support of a second radio communication system. In the context of this application, as shown conceptually in FIG. 1, an inter-system handoff of interest involves the transfer of communication support of mobile station (MS) 102 from an LTE radio access network 30 to GSM radio access network 20 or vice versa. Such handoffs may be performed for a variety of reasons. For example, a mobile station 102 which is currently being served by the LTE radio access network 30 may have moved into a geographic area wherein it can be better served by the GSM radio access network 20. Alternatively, the inter-system handoff may be performed to provide load balancing between the GSM radio access network 20 and the LTE radio access network 30.

Regardless of the particular reason for the handoff, various signaling needs to be performed in order to complete the transfer of support responsibility for the mobile station 102 from or to the LTE radio access network 30. Additionally, unless the mobile station 102 can simultaneously receive signals from both the GSM radio access network 20 and the LTE radio access network 30, the inter-system handoff will be a hard ("break before make") handoff rather than a soft ("make before break") handoff. As an example, handover between GSM (2G) and UMTS (3G) is always a hard handoff. For hard handoffs it is further desirable to minimize the intervening time interval during which the mobile station 102 is not connected to either the GSM radio access network 20 or the LTE radio access network 30. Accordingly the exemplary embodiments described herein address the need for mechanisms to facilitate such inter-system handoffs.

SUMMARY

Systems and methods according to the present invention address this need and others by providing mechanisms to facilitate inter-system handoffs for a mobile system.

According to one exemplary embodiment a method for communicating information associated with handoff of mobile station equipment (MS) from the packet switched bearer of a long term evolution (LTE) radio access network (RAN) to the circuit-switched bearer of a second generation RAN includes: receiving, at a Serving Global Packet Radio Service Support Node (SGSN) associated with the second generation RAN, a request for handoff of a data connection from a mobility management entity (MME) associated with the LTE RAN, determining, by the SGSN based on the user equipment (UE) context received and local information describing the 2G RAN's capabilities, that the data connection is to be handed off to the circuit-switched domain of the second generation RAN, and transmitting, across an interface between the SGSN and a Base Station Subsystem (BSS), a message requesting resources for handover of the MS.

According to another exemplary embodiment a method for initiating a Voice over Internet Protocol (VoIP)/IP Multimedia Subsystem (IMS) call from a mobile station (MS) communicating through a second generation (2G) radio access network (RAN) includes: receiving a packet data protocol (PDP) context activation request message at a 2G serving general packet radio service (GPRS) support node (SGSN), realizing that the PDP context activation request message is activating PDP context for a VoIP/IMS call, determining, by the SGSN based on the previously stored user equipment (UE) context and local information describing the 2G RAN's capabilities, that a data connection is to be handled in the circuit-switched domain of the second generation RAN, and transmitting an instruction message over an interface towards a base station controller (BSC) within a base station subsystem (BSS) to allocate circuit switched bearer(s) for the VoIP/IMS call.

According to yet another exemplary embodiment, a system for communicating information associated with handoff of mobile system equipment (MS) from a long term evolution (LTE) radio access network (RAN) to a second generation RAN includes a Serving Global Packet Radio Service Support Node (SGSN) associated with the second generation RAN, which receives a request for handoff of a data connection from a mobility management entity (MME) associated with the LTE RAN, determines, based on received user equipment (UE) context and local information describing the 2G RAN's capabilities, that the data connection is to be handed off to the circuit-switched domain of the 2G RAN, and transmits a message requesting handover of the MS is transmitted across an interface between the SGSN and a Base Station Subsystem (BSS).

According to still another exemplary embodiment, a system for handling a Voice over Internet Protocol (VoIP)/IP Multimedia Subsystem (IMS) call through a second generation (2G) radio access network (RAN) includes a Serving Global Packet Radio Service Support Node (SGSN) which receives a packet data protocol (PDP) context activation request message, determines that said PDP context activation request message is activating PDP context for said VoIP/IMS call, evaluates a previously stored user equipment (UE) context and local information describing said 2G RAN's capabilities to determine that a data connection is to be in a circuit-switched domain of said second generation RAN, and transmits an instruction message over an interface towards a base station controller (BSC) within an base station subsystem (BSS) to allocate circuit switched bearer(s) for said VoIP/IMS call.

BRIEF DESCRIPTION OF THE DRAWINGS

The accompanying drawings illustrate exemplary embodiments, wherein.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

As mentioned above, it is desirable to provide mechanisms and methods for handing off connections between a Global System for Mobile communication (GSM) radio access network and a "long term evolution" (LTE) radio access network, albeit the present invention is not limited thereto as will be described below. Since the LTE radio access network is a packet-only network, voice signals will be carried on data packets when this network architecture is implemented. Although GSM's GPRS was not provided with real time data support, i.e., no VoIP support, GSM's circuit switched capabilities include real time services. Thus the exemplary embodiments described herein exploit the circuit-switched capabilities in the GSM RAN to provide a substitute for realtime GPRS support to handle, e.g., handoff of a VoIP call from an LTE radio access network.

Figure 1:
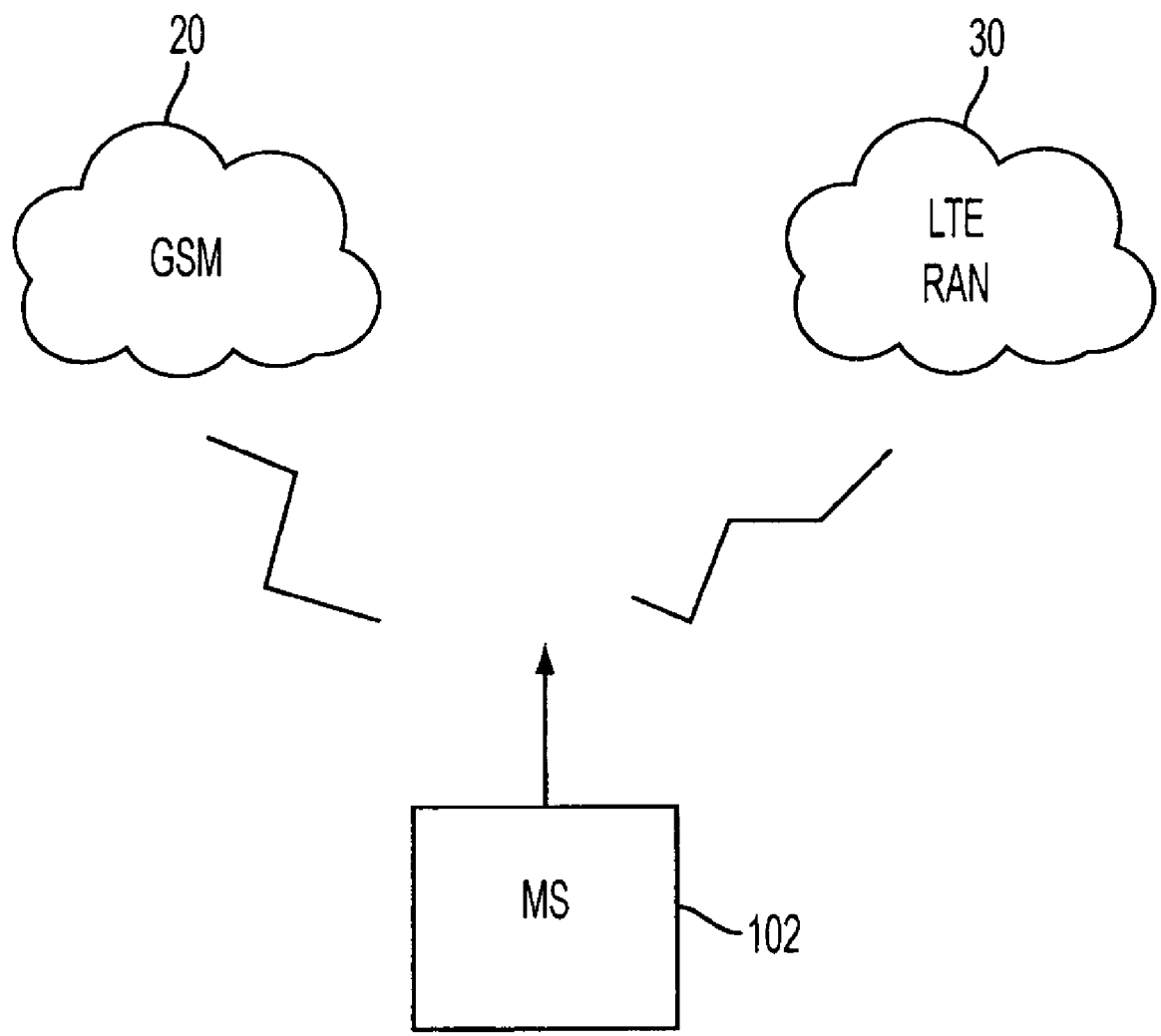
FIG. 1 depicts a conceptual inter-system handoff between a second generation (2G) radio access network (RAN) and a long term evolution (LTE) RAN.
Figure 2:
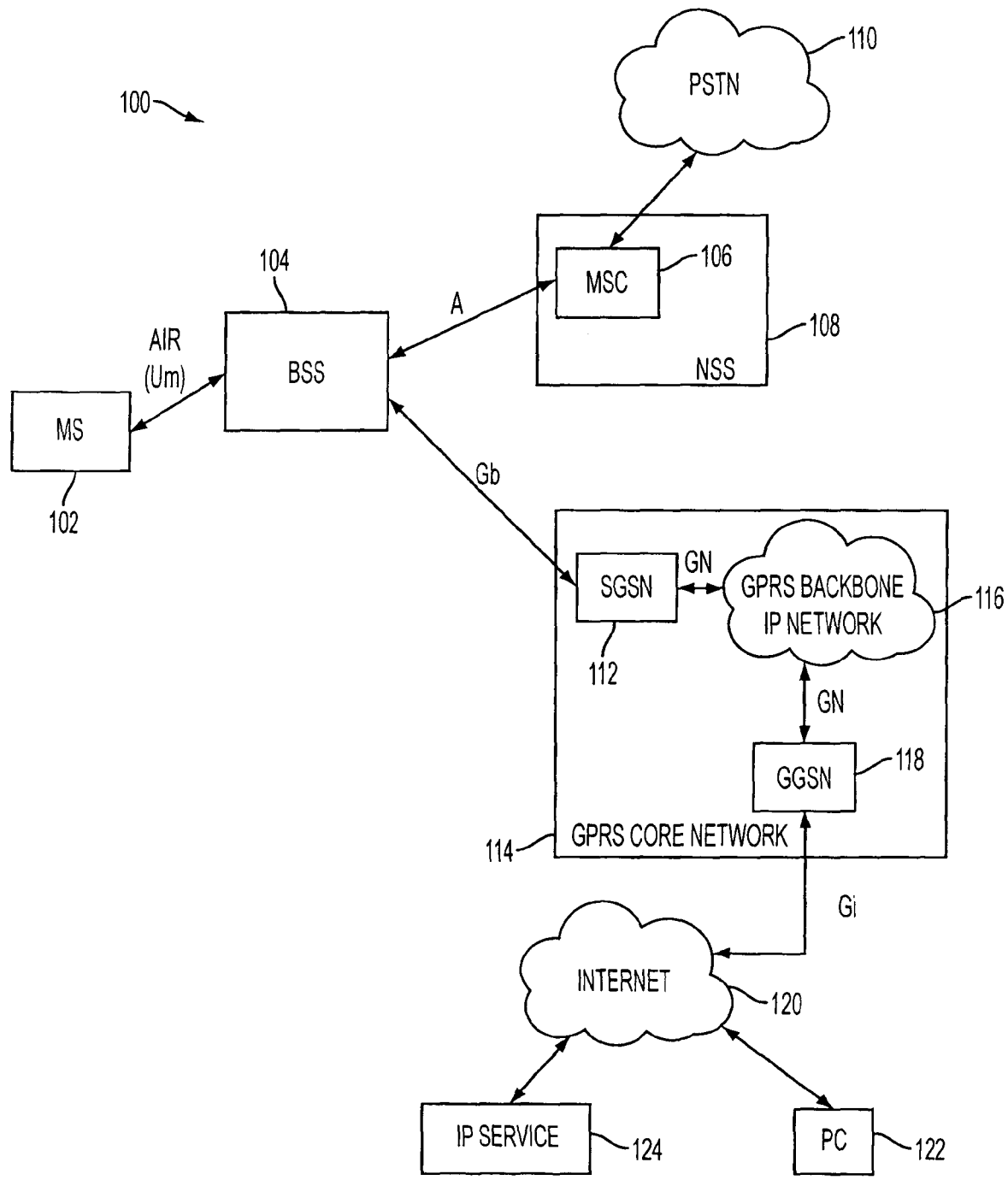
FIG. 2 depicts an exemplary Global System for Mobile communications (GSM) network.

To provide some exemplary context for this discussion a GSM mobile network 100 (which is a combination of a 2G RAN and a 2G core network (CN)) capable of both voice and data transmissions will be described in FIG. 2, and then an LTE access network/system architecture evolution (SAE) 300 will be described in FIG. 3. Therein, a mobile station (MS) 102, associated with user equipment (UE), such as a cell phone, is in communication over the air interface (Um) with a base station system (BSS) 104. BSS 104 is in communication with a mobile switching center (MSC) 106 over the A interface. The BSS 104 includes a transceiver(s) (Base Transceiver Station (BTS) not shown) and a controller (Base Station Controller (BSC) not shown) for handling signals between the MS 102 and the NSS 108. The MSC 106 is part of the network and switching subsystem (NSS) 108, which is responsible for call switching and interfacing with the public switched telephone network (PSTN) 110. The BSS 104 is also in communication through the Gb interface with a serving general packet radio service (GPRS) support node (SGSN) 112 within the GPRS core network 114. The SGSN 112 transmits and receives data packets from an associated BSS 104 for an MS 102. Also, the SGSN 112 has access to the 2G RAN's capabilities for voice/data transmissions. Additionally, the gateway GPRS support node (GGSN) 118 is within the GPRS core network 114 and communicates with the SGSN 112 through a GPRS backbone 116. The GGSN 118 is responsible for interfacing with the GPRS backbone 116 and external networks involved with data packet transmissions. The GPRS core network 114 is responsible for session management and transport of Internet Protocol (IP) packets received via the internet 120 (or other IP networks) from such sources as a personal computer 122 and various service providers 124 that transmit content in IP packets. The various interfaces and other elements of this exemplary GSM mobile network 100 are described, for example, in the standards document GSM release 1997 which can be found online at www.3gpp.org.

Of particular interest for this application, as will be described below is the A interface. Typically, the A interface specifies the interconnection within the circuit-switched part of the GSM network architecture between the BSS 104 and an MSC 106. The A interface supports 64 Kbps channels for signalling and traffic using, for example, protocols such as Direct Transfer Application Part (DTAP) and Base Station Subsystem Management Application Part (BSSMAP). The interested reader can find more information regarding the GSM's A interface in the standards specifications documents 3GPP TS 48.001-48.008, found online at www.3gpp.org-/ftp/Specs/archive/48_series/.

Figure 3:
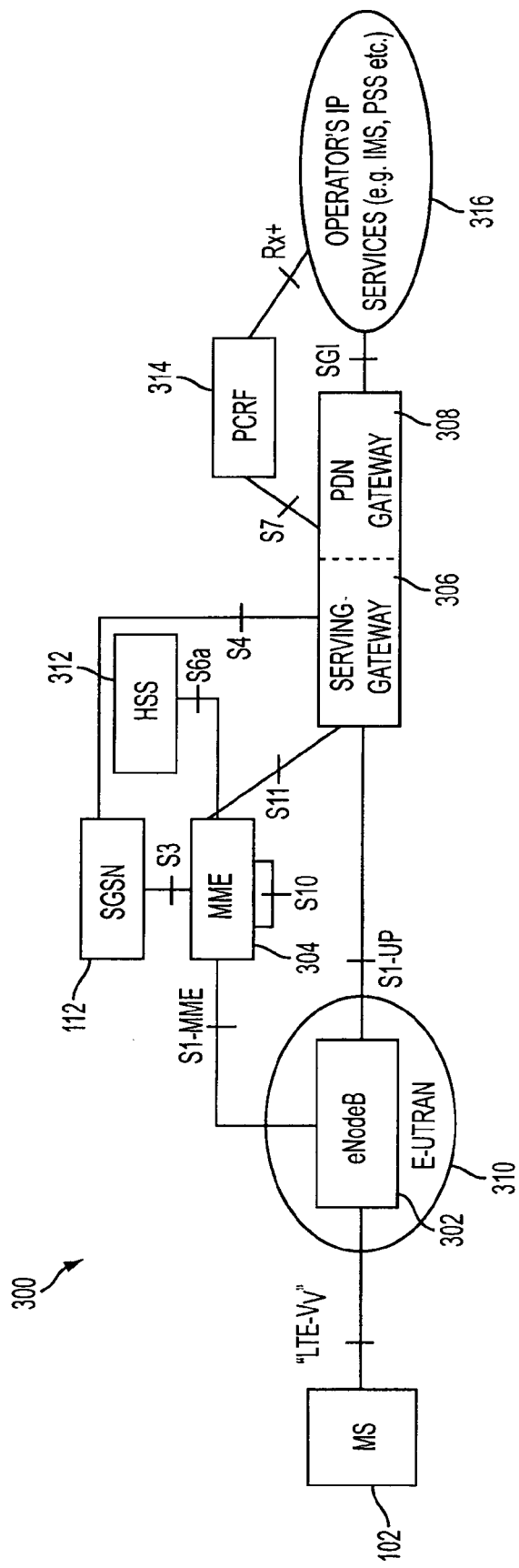
FIG. 3 illustrates an LTE RAN and a system architecture evolution (SAE) core network (CN) in communication with other devices according to exemplary embodiments.

An exemplary LTE RAN/SAE CN 300 that could stand alone, or provide overlapping radio communication service coverage with the GSM mobile network 100, is shown in FIG. 3. Initially, MS 102 is in communication with an eNodeB 302 which resides within an Evolved-Universal Terrestrial Radio Access Network (E-UTRAN) 310 which is also known as an LTE RAN, and contains various control functions for connection mobility control, scheduling and radio resource management. The eNodeB 302 communicates in the control plane via an S1-MME interface with a mobility management entity (MME) 304. MME 304 manages for example the distribution of paging messages to eNodeB(s) 302 and is also involved in handoff signaling according to exemplary embodiments as described below. Additionally, the MME 304 is in communications with a SGSN 112 via the S4 interface and with a home subscriber server (HSS) 312 which is a database containing subscriber information and deals with authorization/authentication issues.

The eNodeB 302 also communicates in the user plane via an S1-UP interface with a Serving Gateway 306 which is functioning as the local mobility anchor point for inter-eNodeB handover and for inter-3GPP mobility. The Serving Gateway 306 has a communications link with the MME 306 through the S11 interface and is also in communications with a Packet Data Network Gateway (PDN GW) 308 which allows access to the operator's IP services 316 where for example IP Multimedia Subsystem (IMS) services to support telephony services will reside. A Policy and Charging Rules Function (PCRF) 314 is in communications with both the PDN Gateway 308 and the operator's IP Services 316. The PCRF 314 deals with allowing or discarding traffic and with rules dealing with packet grouping. The various interfaces and other elements of this exemplary LTE/SAE network 300 are described in their standards documents such as, 3GPP TS 23.401 available online at www.3gpp.org/ftp/Specs/archive/23_series/23.401/ and other articles such as 3GPP TR 25.913 available online at www.3gpp.org and "UTRA-UTRAN" Long Term Evolution (LTE) and 3GPP System Architecture Evolution (SAE)" available online at www.3gpp.org/Highlights/LTE/LTE.htm dated 2006-10-4.

The nodes and devices described above with respect to both the exemplary second generation GSM mobile network 100 and the exemplary LTE RAN/SAE CN 300 are used to varying degrees when an MS 102 in communications with another device is handed off from the LTE RAN/SAE CN 300 to the GSM mobile network 100 or vice versa. Various exemplary embodiments will be described below using these previously described nodes and devices for efficiently executing handoffs between these two types of RANs. Additionally, other exemplary embodiments provide for various uses of this hybrid system, e.g., initiating a VoIP/IMS call from a MS 102 while in a GSM mobile network 100 and these exemplary embodiments will also be described in more detail below.

Figure 4:
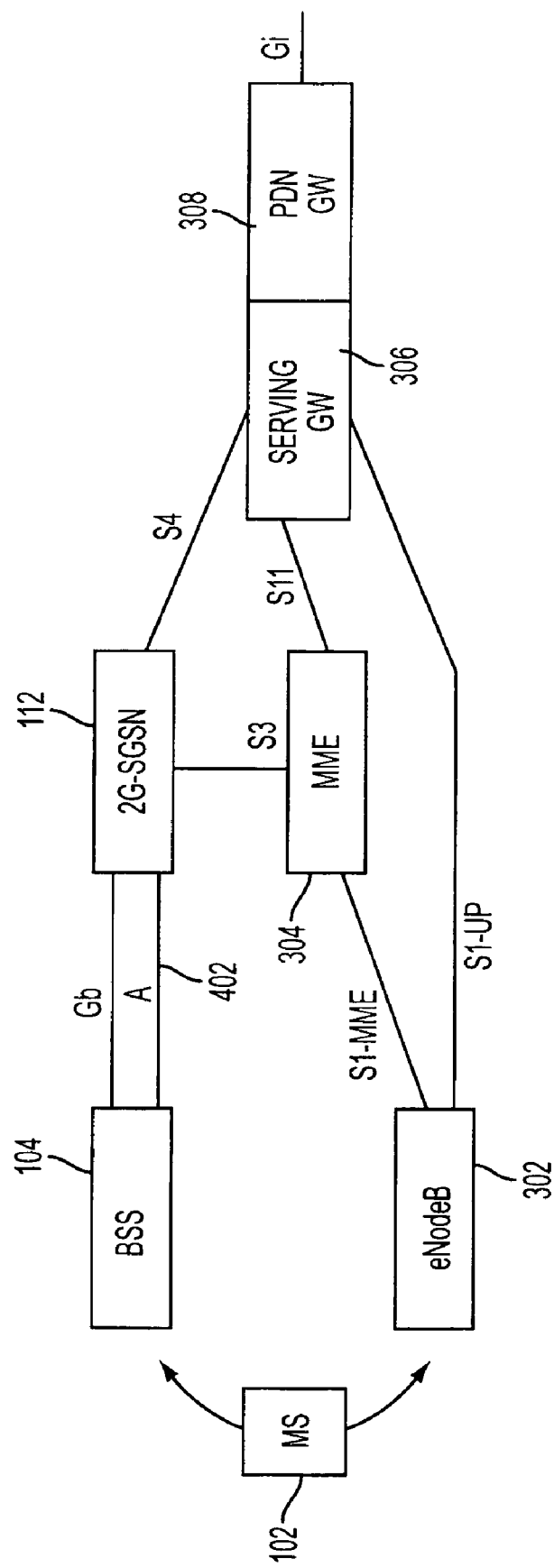
FIG. 4 shows how an LTE/SAE system is interconnected with a GSM/GPRS system for performing a handoff between a 2G RAN and a LTE RAN according to exemplary embodiments.

According to exemplary embodiments, handoff for an MS 102 can occur between a LTE RAN/SAE CN 300 and a GSM mobile network 100 as illustrated in FIG. 4. This handoff procedure involves elements of the GSM mobile network 100 (BSS 104, 2G-SGSN 112), elements of the LTE RAN/SAE CN 300 (eNodeB 302, MME 304, Serving Gateway 306 and PDN Gateway 308) and MS 102. Consider that while being served by the LTE RAN/SAE CN 300, the MS 102 is in communications with eNodeB 302, e.g., has an ongoing data connection. The eNodeB 302 is in communications with both the MME 304 (control plane) and the Serving Gateway 306 (user plane). The MME 304 is able to communicate with the 2G-SGSN 112 through an S3 interface, while the Serving Gateway 306 is able to communicate with the 2G-SGSN 112 through an S4 interface. The 2G-SGSN 112 is also in communications with the BSS 104.

In the GSM mobile network 100, the 2G-SGSN 112 typically communicates with the BSS 104 through a Gb interface, however, according to exemplary embodiments, the 2G-SGSN 112 now will also be equipped with an A interface 402 to enable circuit-switched (CS) domain communications with the BSS 104, which already has an A interface. A interfaces, per se, are described in the afore-mentioned standards documents. Once the 2G-SGSN 112 receives the request for a packet switched handoff from MME 304, the 2G-SGSN 112 will check the UE context associated with the identity of the MS 102 (provided in the handoff request message) and recognize that the MS 102 is currently engaged in a real-time data connection, e.g., a VoIP/IMS call. The 2G-SGSN 112 will also then identify that this particular connection can not be supported in the packet-switched domain of the 2G RAN and that it is best supported in the circuit-switched domain. The 2G-SGSN 112 will then use CS handoff signaling over the A interface 402 with the BSS 104 to request a traffic channel (TCH). This TCH could, for example, be a transparent sixteen kpbs TCH for data calls from the BSS 104 or a voice TCH. Different processes can be used to support the data connection depending upon which type of TCH is selected, as will be described in more detail below. Using the above described exemplary hybrid system described in FIG. 4, an exemplary call flow for performing a handoff according to an exemplary embodiment will be described with respect to FIG. 5.

Figure 5:
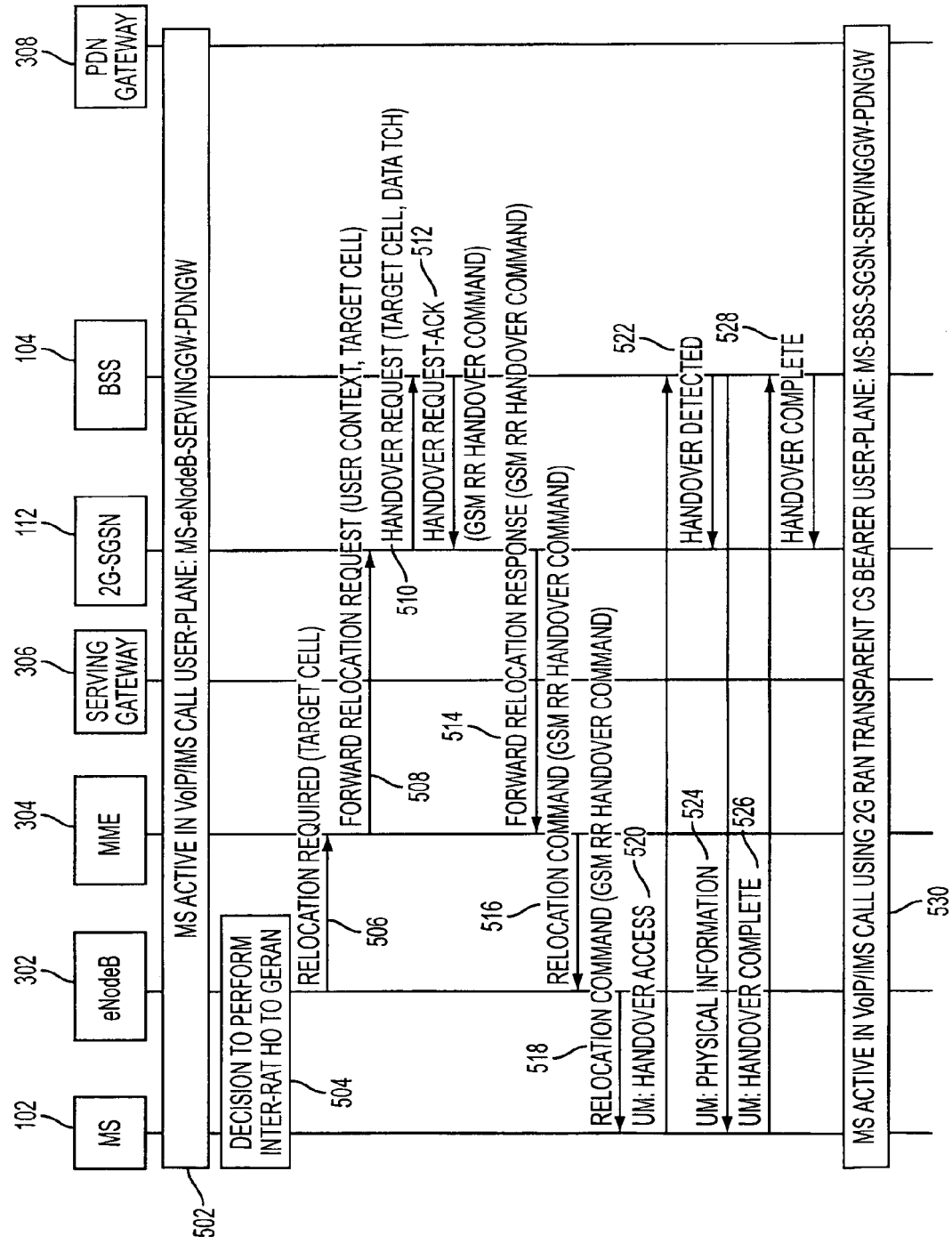
FIG. 5 depicts a call flow for a handoff between a 2G RAN and an LTE RAN according to exemplary embodiments.

FIG. 5 shows an exemplary call flow for the handoff procedure when an MS 102 is active in, for example, a VoIP/IMS call using an LTE RAN/SAE CN 300 and needs to be handed off to a GSM mobile network 100. Initially the MS 102 is active in a VoIP/IMS call 502. This VoIP/IMS call consists of both signaling and user plane parts and these are both transported in the user plane of LTE RAN/SAE CN. The user plane within the LTE RAN/SAE CN 300 includes communications between the MS 102, eNodeB 302, Serving Gateway 306 and PDN Gateway 308. The need for a handoff (HO) 504 to another RAN, e.g., the RAN which is part of GSM mobile network 100 capable of handling data packets, is determined by the eNodeB 104. The eNodeB 104 transmits a relocation required message 506 including an identification of a target cell in the GSM mobile network 100 to the MME 304. The MME 304 then sends the forward relocation request message 508, including target cell identification and UE context, to the 2G-SGSN 112. Once the 2G-SGSN 112 receives the request for a packet switched handover in the forward relocation required message 508, the 2G-SGSN 112 will check the received UE context that also contains information about the current PDP contexts allocated for the MS 102 and recognize that the MS 102 is engaged in a VoIP/IMS call. The 2G-SGSN 112 will also then identify that this particular connection can not be supported in the packet-switched domain of the 2G RAN based on the UE context received and local information describing the 2G RAN's capabilities and that this particular connection is best supported in the circuit-switched domain.

The 2G-SGSN 112 then uses circuit switched hand off signaling over the A interface 402 by transmitting a handover request message 510 including target cell and a TCH request to the BSS 104. The TCH requested could be either a voice TCH or a TCH for data depending upon requirements associated with the connection to be handed over and/or available resources. Exemplary implementation using both types of TCHs will be described in more detail below. The BSS 104 returns information over the A interface 402 associated with the reserved TCH for supporting the connection after it is handed over to the GSM mobile network 100 in a GSM Radio Resources (RR) handover command. The GSM RR handover command message is typically included in the (BSSMAP) handover request acknowledge message 512 (as described in 3GPP TS 48.008) to the 2G-SGSN 112, which sends the forward relocation response (as well as the information in the GSM RR handover command) message 514 to MME 304. The MME 304 transmits a relocation command message 516, which includes the GSM RR handover command information, to the eNodeB 302 which forwards this message 518 on to the MS 102.

Upon receipt of the GSM RR handover command message 518, the MS 102 follows the received instructions and tunes to the indicated circuit switched bearer(s). Initially, the MS 102 transmits handover access messages 520 over the air interface (also known as the Um interface) to the BSS 104. Handover is thus detected by the BSS 104, which notifies the 2G-SGSN 112 in message 522. The BSS 104 then transmits physical information in message 524 over the air interface to the MS 102 to indicate to the MS 102 that it can stop sending of the handover access messages. Additionally, message 524 also contains information about the Timing advance. The MS 102 then transmits message 526 indicating that the handover is complete to the BSS 104, which in turn transmits a message 528 indicating handover complete to the 2G-SGSN 112. At this point in time the MS 102 is active in the VoIP/IMS call using a circuit-switched TCH in a 2G-RAN in the user plane, which now includes the MS 102, the BSS 104, the 2G-SGSN 112, the Serving Gateway 306 and the PDN Gateway 308.

Figures 6A, 6B:
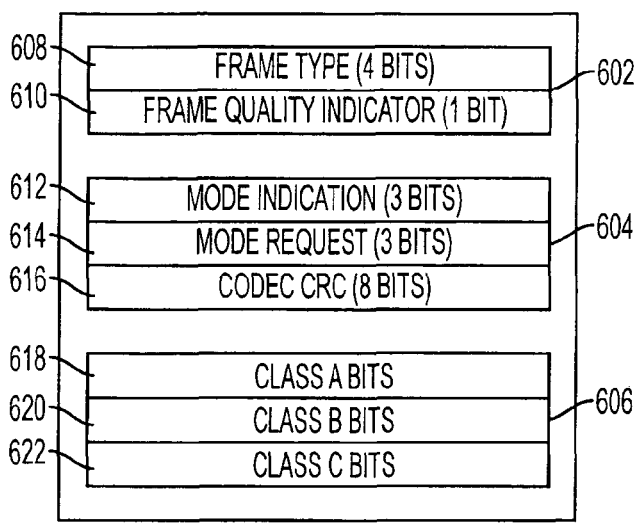
FIG. 6(a) depicts a generic Adaptive Multi-Rate (AMR) frame.
FIG. 6(b) shows a table that defines a four bit field for frame content of an AMR frame.

According to another exemplary embodiment, when a voice TCH is selected and used, data associated with the post-handoff connection between the MS 102 and GSM mobile network 100 is transported using the Adaptive Multi-Rate (AMR) codec for the implementation of this invention. According to one exemplary embodiment, the existing standardized A interface mode of operation Tandem Free Operation (TFO) is applied. Alternatively, the Transcoder Free Operation (TrFO) can be standardized and used in the A-interface for communications between the MS 102 and the 2G-SGSN 112. AMR is described in 3GPP TS 26.101 version 7.0.0 dated June 2007, the disclosure of which is incorporated by reference herein. A generic frame format for AMR codec for both the speech and comfort noise frames is shown in FIG. 6(a) and includes an AMR header section 602, an AMR auxiliary information section 604 and an AMR core frame 606. The AMR header section 602 includes a frame type field 608 and a frame quality indicator 610. The AMR auxiliary information section 604 includes the mode indication 612, the mode request 614 and the codec cyclic redundancy check (CRC) 616 fields. The AMR core frame 606 includes the speech parameter bits for a speech frame or the comfort noise parameter bits for a comfort noise frame. If the AMR core frame 606 is a speech frame, it includes class A bits 618, class B bits 620 and class C bits 622. In the case where the AMR core frame 606 is a comfort noise frame, the comfort noise parameters replace the class A bits 618 while the class B bits 620 and the class C bits 622 are not included in the AMR core frame 606.

FIG. 6(b) shows a table 630 that defines the 4-bit frame type field 608. This table is also reused for the mode indication field 612 and the mode request field 614. As can be seen in table 630, box 632 shows values 12-14 which are available for use. According to exemplary embodiments, when a voice TCH is selected by the 2G-SGSN 112 and data is transmitted using the AMR codec, a value can be placed in the appropriate field to indicate that data is sent. In other words during silent periods of communication between the 2G-SGSN 112 and the MS 102, data that is not a voice sample can be transmitted over the TCH using an AMR codec and be properly identified. An exemplary embodiment using an AMR codec to transport data via a voice TCH is described below with respect to FIGS. 7(a) and 7(b).

Figure 7A:
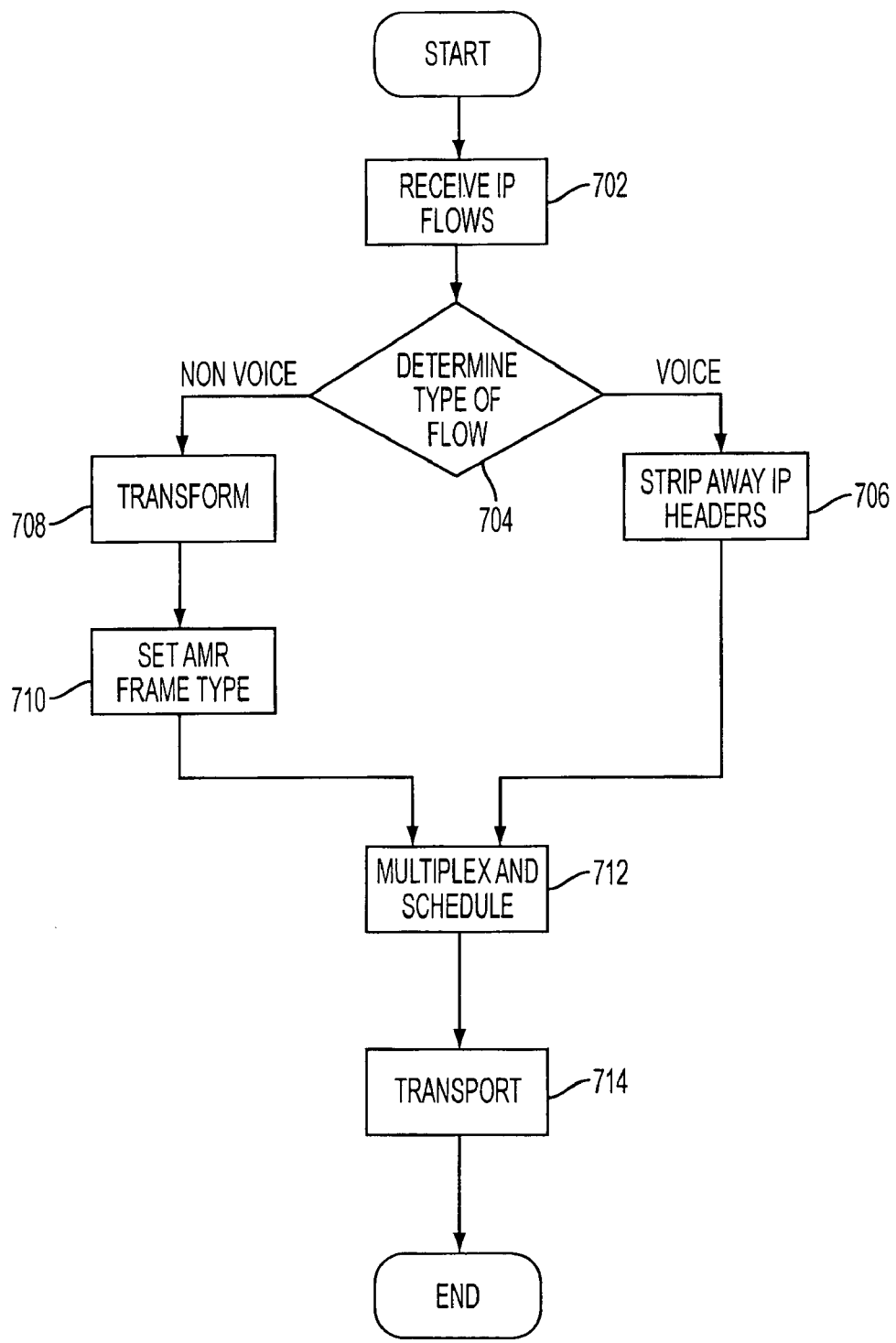
FIG. 7(a) illustrates a process flow for transmission from either a Serving General Packet Radio Service (GPRS) Support Node (SGSN) or a terminal that receives Internet Protocol (IP) flows according to exemplary embodiments.
Figure 7B:
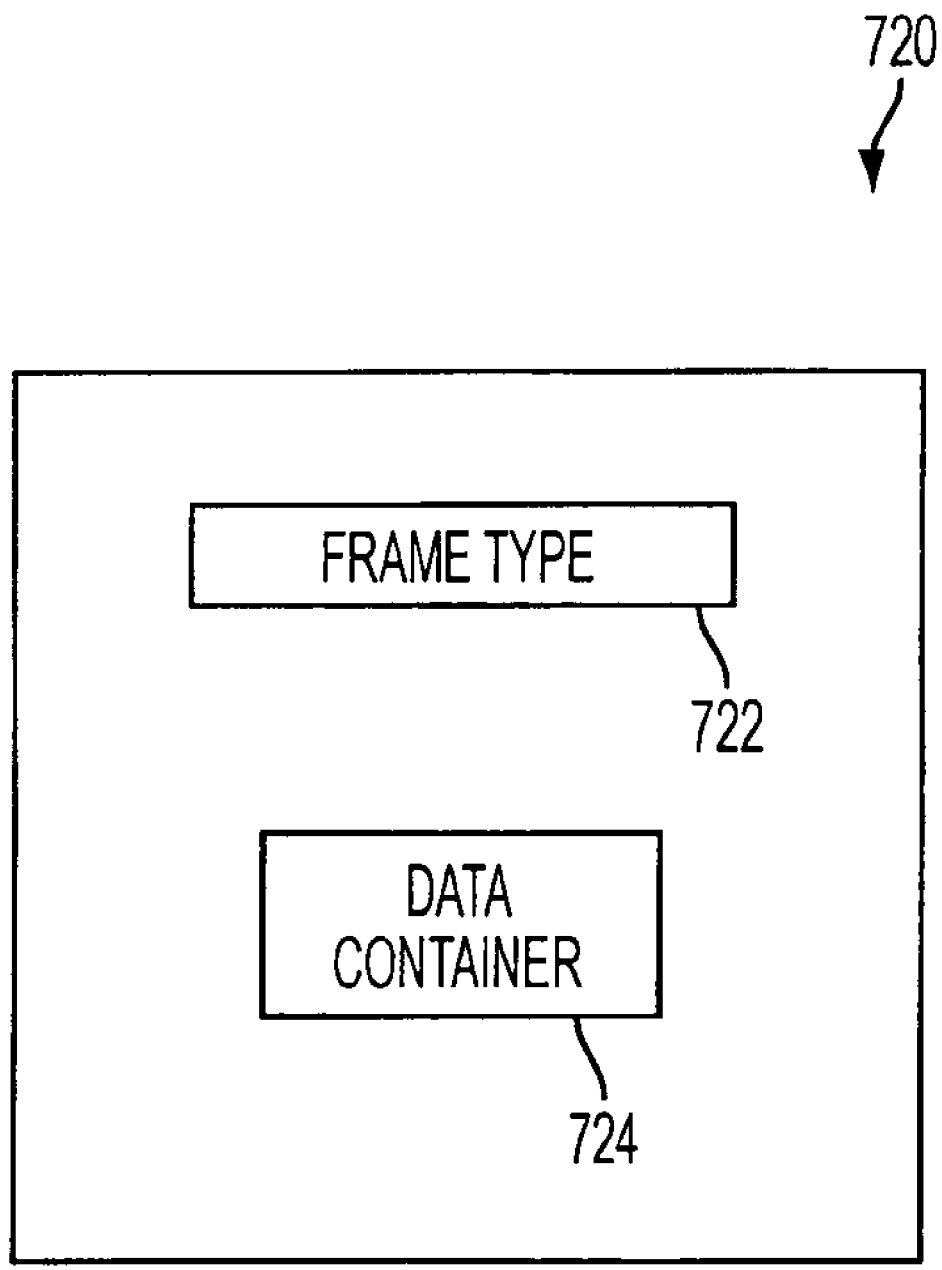
FIG. 7(b) shows an AMR frame according to exemplary embodiments.

FIG. 7(a) shows an exemplary process flow for transmission from either a 2G-SGSN 112 or a terminal, e.g., a UE associated with MS 102, which receives IP flows in step 702 over a voice TCH. The type of flow received is then determined in step 704. If the flow is a voice flow, the IP headers are stripped away in step 706. Additionally, other headers, such as, UDP and RTP headers can also be stripped away from the voice flow. Once the IP headers are stripped away, the remaining information in the voice flow, e.g., the AMR frame, is transported to a multiplexor. At this point the voice flow is appropriately multiplexed, entered into the correct queue and scheduled for transmission in step 712. If the type of flow is determined to be non-voice in step 704, the non-voice flow is sent to be transformed in step 708. Transforming, in this instance, includes putting the non-voice packets into a packet transport protocol, in the preferred embodiment the packet data convergence protocol (PDCP) is re-used, where header compression is performed, e.g., using Robust Header Compression (ROHC), over a link layer, e.g., link access protocol on a modified D (LAPDm) channel. Upon completion of the transformation in step 708, the AMR frame 720, as shown in FIG. 7(b) includes a frame type 722 and a data container 724 which includes framing information and the CRC information. The AMR frame 720 is sent onward to step 710, where the AMR frame type 722 is set to one of the values reserved for future use as previously described above and positioned to enter the correct queue. The AMR frame 720 is then sent onward for multiplexing and scheduling in step 712. From scheduling, both voice and non-voice flows are then sent to step 714 for transportation away from the 2G-SGSN 112 or terminal. Additionally, when using the voice TCH, voice data bits are protected unequally, i.e., a more significant bit is protected more than a less significant bit, which gives better coverage by approximately 3 db as compared to using a data TCH. While the above described exemplary process flow shown in FIG. 7 shows the process from the point of view of transmission to a BSS 104, for reception from a BSS 104 a similar process performed in reverse order can be used.

As described above, according to exemplary embodiments the TCH provided in the GSM mobile network 100 for supporting the connection post-handoff can be either a data TCH or a voice TCH. When a data TCH, e.g., a transparent sixteen kpbs TCH, is chosen the 2G-SGSN 112 schedules the different flows, i.e., packet data protocol (PDP) contexts, depending upon the type of flow being handled by the 2G-SGSN 112. For example, voice flows will typically have precedence over data flows, this means that during silent periods, the 2G-SGSN 112 may send other data than voice e.g. IMS signaling messages. This allows for PDP context to be present even though circuit switched data is currently being transmitted. Additionally, according to exemplary embodiments the 2G-SGSN 112 can use the signaling interface to transfer IMS signaling information, e.g., use the existing Direct Transfer Application Part (DTAP) mechanism, between the 2G-SGSN 112 and the MS 102, which IMS signaling information can be compressed.

Figure 8:
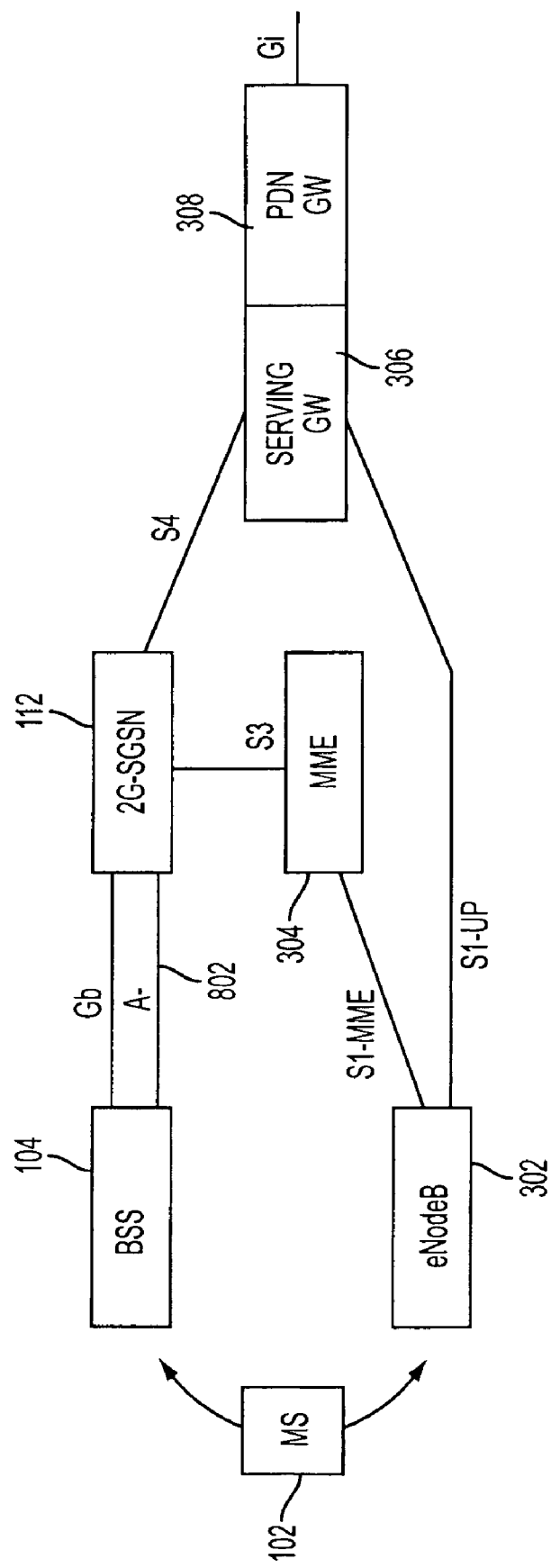
FIG. 8 shows how an LTE/SAE system is interconnected with a GSM/GPRS system for performing a handoff between a 2G RAN and a LTE RAN according to exemplary embodiments.

According to another exemplary embodiment, handoff for an MS 102 can occur between an LTE RAN/SAE CN 300 and a GSM mobile network 100 as illustrated in FIG. 8. This handoff procedure uses elements of the GSM mobile network 100 (BSS 104, 2G-SGSN 112), elements of the LTE RAN/SAE CN 300 (eNodeB 302, MME 304, Serving Gateway 306 and PDN Gateway 308) and MS 102. While in the LTE RAN/SAE CN 300, the MS 102 is in communications with eNodeB 302. The eNodeB 302 is also in communications with both the MME 304 (control plane) and the Serving Gateway 306 (user plane). The MME 304 is able to communicate with the 2G-SGSN 112 through an S3 interface, while the Serving Gateway 306/PDN Gateway 308 is able to communicate with the 2G-SGSN 112 through an S4 interface. The 2G-SGSN 112 is also in communications with a BSS 104.

As mentioned earlier, and described in the afore-described embodiment, in the GSM mobile network 100 the 2G-SGSN 112 typically communicates with the BSS 104 through a Gb interface, the 2G-SGSN 112 is instead (or additionally) provided with an A interface 402 to enable it to perform handoff signaling as described above with respect to FIGS. 4 and 5. However, according to these exemplary embodiments, both the 2G-SGSN 112 and the BSS 104 now will be equipped with an "A-" interface 802 for the CS domain communications, i.e., a modified version of the standardized A interface. Once the 2G-SGSN 112 receives the request for a packet switched handoff from MME 304, the 2G-SGSN 112 will check the received UE context and determine that the MS 102 is currently engaged in a VoIP/IMS call. The 2G-SGSN 112 then also determines, based on local information describing the 2G RAN's capabilities, that that the data connection is to be handed off to the circuit-switched domain of the second generation RAN. The 2G-SGSN 112 will then use CS handoff control signaling over the A-interface 802 with the BSS 104 to request a traffic channel (TCH). The call flow for a handoff for this exemplary embodiment is the same as the call flow described in FIG. 5 except that an A-interface 802 is used instead of the A interface 402. The A-interface 802 can be very similar to the A interface 402, i.e., a 64 kbit/s circuit switched channels, as long as the BSS 104 realizes that it is not the original A interface 402 and that it allows the BSS 104 to actively assist in user plane communications. Alternatively, a packet switched method over an E1 line(s) (2 mbit trunk), T1 trunk(s), or some other physical transport media such as Ethernet could be used. Additional details regarding this exemplary system using an A-interface 802 are described below.

As described above, according to exemplary embodiments both the BSS 104 and the 2G-SGSN 112 are equipped with an A-interface 802 which allows the BSS 104 to assist in handling the user plane, i.e., the BSS 104 assists in how the user plane will multiplex voice and other data over the radio. For example, with the BSS 104 being involved in the user plane, it is aware of the data types received from either the 2G-SGSN 112 or the MS 102 and if transparent data is received then a shorter reach over the radio will occur. This shorter reach occurs because there is a compressed IP header which allows for fewer bits to be sent in the radio burst, and that voice uses unequal error protection. Additionally, any bit error will cause the receiver to discard the radio burst regardless of the significance of the bits.

Figure 9A:
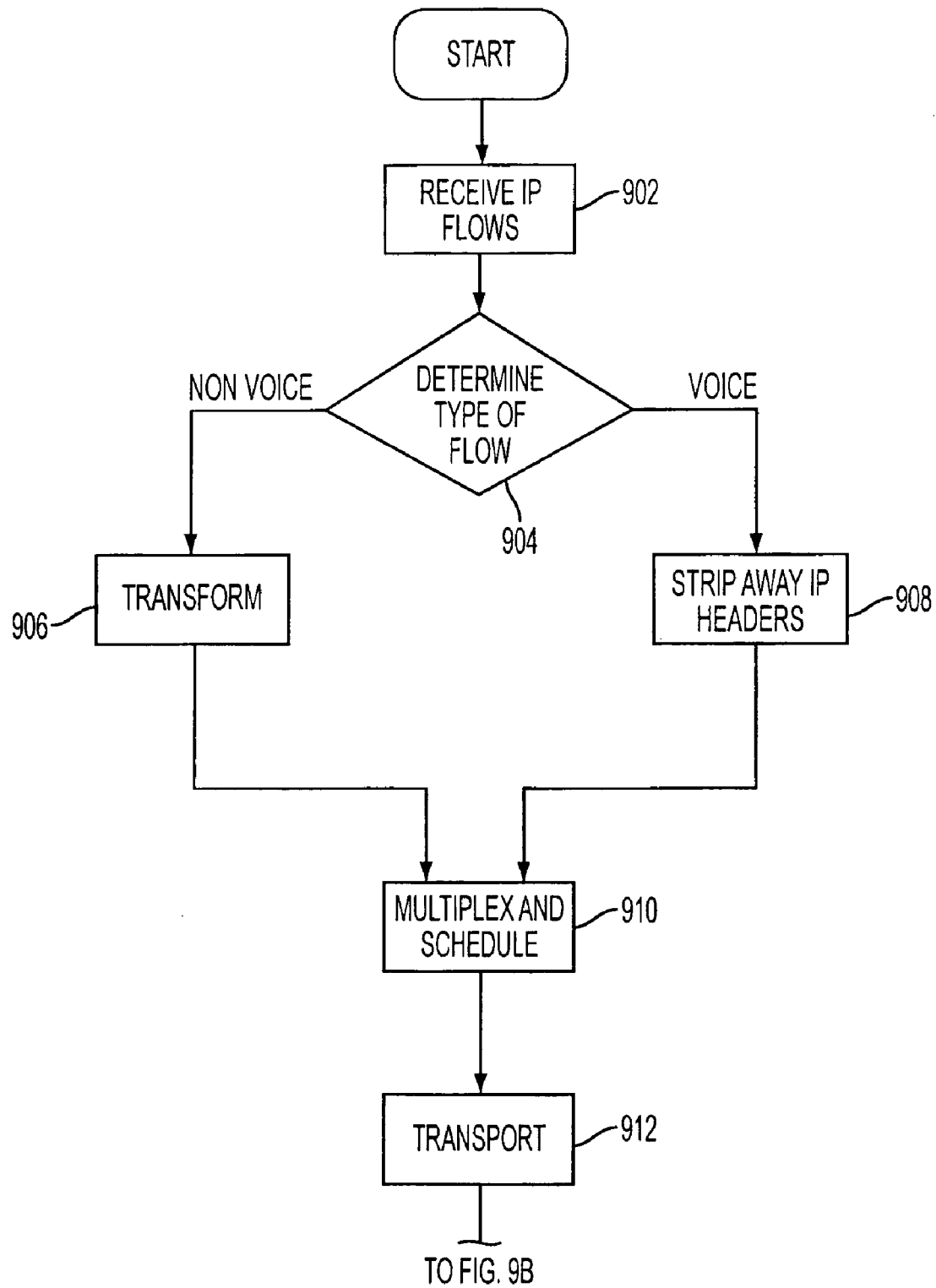
FIG. 9(a) illustrates a process flow for transmission through a SGSN to a Base Station System (BSS) according to exemplary embodiments.
Figure 9B:
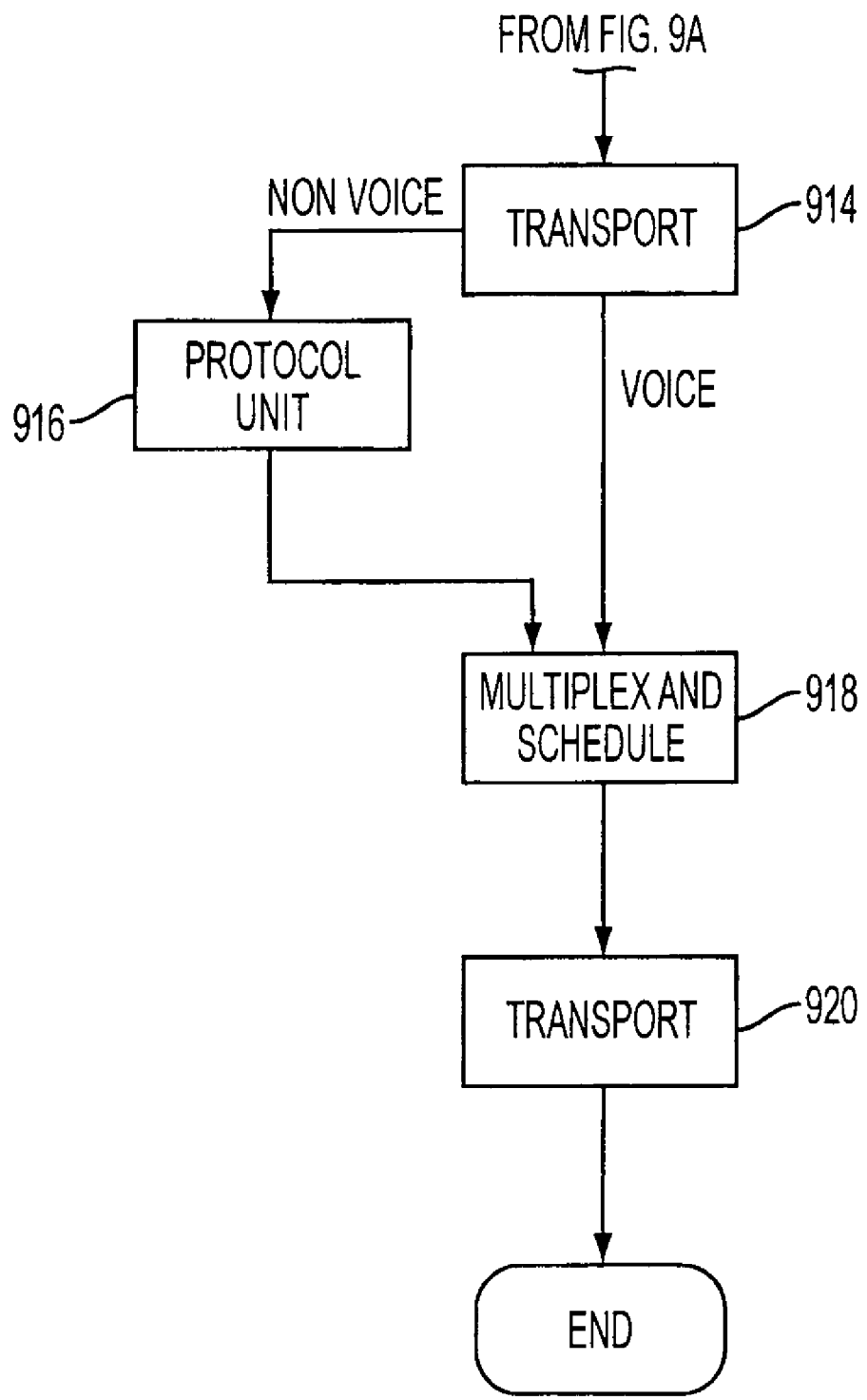
FIG. 9(b) shows a process flow for transmission for transmissions through a BSS according to exemplary embodiments.

In this exemplary embodiment using the A-interface 802, flows are transmitted from 2G-SGSN 112 to the BSS 104, for example, using FIG. 9(*a*) which represents the flow processing within the 2G-SGSN 112 and FIG. 9(*b*) which shows the received flow processing within the BSS 104. Initially, IP flows are received in step 902 by the 2G-SGSN 112. In step 904 it is determined which type of flow has been received. Non-voice flows are transformed in step 906 by putting non-voice data packets into a PDCP, where header compression is performed preferably using ROHC, over a link layer, e.g., link access protocol on a LAPDm channel. Upon completion of the transformation in step 906, the data is sent to a multiplexer for multiplexing and scheduling in step 910. For voice flows, the IP headers are stripped away in step 908 and then sent to a multiplexer for multiplexing and scheduling in step 910. Additionally, the non-voice and voice flows are queued up as appropriate. After the flows have been multiplexed and scheduled they are transported, according to their schedule, by a transportation interface in step 912.

Upon leaving a transportation interface, or communication interface, within the 2G-SGSN 112 in step 912, the flows are received by a transportation interface associated with the BSS 104 in step 914. Non-voice flows are sent to protocol unit 916 which uses the spare values in LAPDm to indicate that these packets are PDCP user plane packets. By using the spare values in LAPDm to indicate that the packets are PDCP packets, it allows the receiving end to forward the packet(s) to the desired higher protocol layer. Also, this allows the LAPDm to know on which underlying channel to send the packet(s) on. These non-voice flows are then sent onward for multiplexing and scheduling in step 918. Voice flows are transported in step 914 directly to the multiplexer for multiplexing and scheduling in step 918. After being appropriately queued, the flows are sent on for transport. In step 920 the flows are transported/transmitted from the BSS 104 to the MS 102. The scheduler will send data units on the forward access channel (FACH) when there are no voice samples to send, e.g., during silent periods. This is in contrast to normal usage of the FACH, which is normally used during handover and involves no waiting on silent periods. Also, voice will be directed to a TCH as described above. A bit is included in each burst indicating if it is a TCH or a FACH. Additionally, the scheduler can put IMS signaling on a scheduled access channel (SACH) preferably using a compressed mode of IMS signaling.

Figure 10:
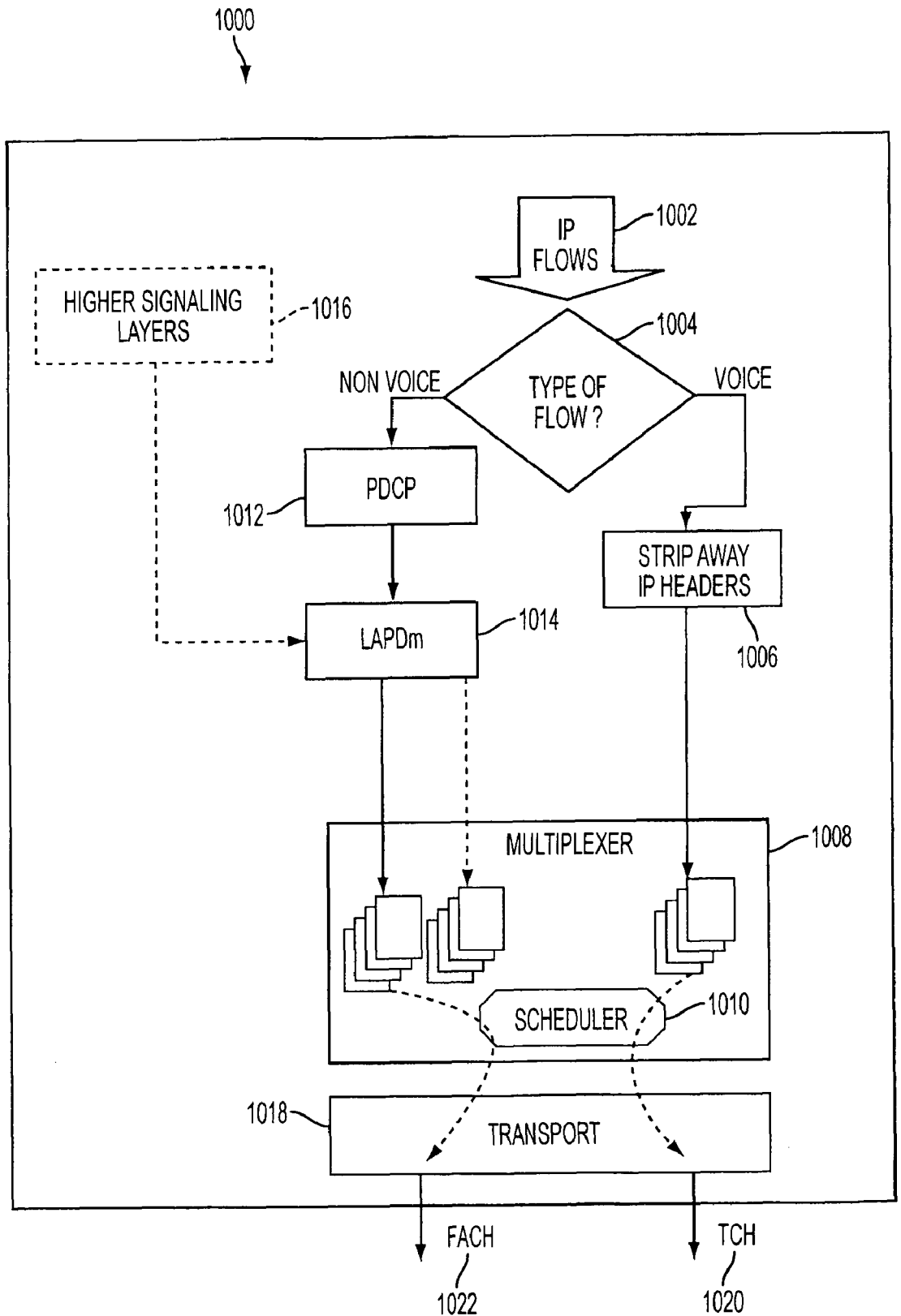
FIG. 10 depicts a collapsed terminal flow according to exemplary embodiments.

According to another exemplary embodiment, flows are transmitted from a terminal 1000 associated with MS 102 to a BSS 104, for example, using the exemplary architecture illustrated in FIG. 10 which shows the flow processing within the terminal 1000. Initially, IP flows 1002 are received from the upper layers for transmission towards the network. The type of IP flow is determined in step 1004, and if the flow is a voice flow, then the IP headers are stripped away in step 1006. These flows then are passed on for multiplexing in step 1008 and scheduling in step 1010. If the type of flow is determined to be a non-voice flow in step 1004, the non-voice flow is transformed in step 1012 by placing non-voice data packets into a PDCP, where header compression is performed preferably using ROHC over a link layer, e.g., link access protocol on a LAPDm channel in step 1014. Additionally, higher signaling layers 1016 (and/or their contents) can be input as necessary into the flows in step 1014. Upon completion of the transformation in steps 1012 and 1014 the data is sent to a multiplexer for multiplexing in step 1008 and scheduling in step 1010. Both the voice and non-voice flows are queued as appropriate. After the flows have been multiplexed and scheduled they are transported, according to their schedule, by a transportation interface in step 1018. Non-voice flows are transmitted through a FACH 1022 and the voice flows are transmitted over a TCH 1020. As described above, a FACH 1022 is normally used for handover signaling and breaks in when handover is to be performed. In this exemplary embodiment FACH 1022 is also used for transporting IP flows that are non voice flows. When it is used for IP flows, FACH 1022 is scheduled for use during otherwise silent periods.

The exemplary embodiments described above provide for the handoff of an MS 102 between a 2G RAN and a LTE RAN. During this process and during ongoing communications, security of the call and the network is a desirable feature. To facilitate this, an authorization process is used, which among other things, provides a selected ciphering algorithm and indication of the selected ciphering key to MS 102 from the network. According to exemplary embodiments, ciphering processes can be used to securely facilitate handoff as will be described in more detail below.

According to one exemplary embodiment, when the 2G-SGSN 112 is borrowing CS resources from a Base Station Controller (BSC) within BSS 104, the 2G-SGSN 112 selects one of the ciphering keys used for the packet switched (PS) domain and signals to the BSS 104 that this selected ciphering key is also to be used in the CS domain. In the same way, the MS 102 will receive information about the ciphering key to be used, e.g., it is informed of this information via the GSM RR Handover Command in message 518. The ciphering algorithm selected is typically chosen by the 2G-SGSN 112 from known ciphering algorithms that the MS 102 can use, e.g., a ciphering algorithm received during the MS Radio Access Capability Information. Alternatively, if the MS 102 supported ciphering algorithms are not known by the 2G-SGSN 112, then the 2G-SGSN 112 selects a ciphering algorithm from a known list of ciphering algorithms that the MS 102 supports. Since the MS 102 needs to be using the same ciphering algorithm and the correct ciphering key for the network, it is informed of this information via the GSM RR Handover Command 518 described above. When ciphering is to be used in the CS domain, the BSC (not shown) within BSS 104 normally selects the ciphering algorithm based on the algorithms supported by the MS 102 and the MSC 106. The MS 102 typically informs the MSC 106 of the supported ciphering algorithms in the MS Classmark information or optionally also to the 2G-SGSN 112 as part of the MS Radio Access Capability Information.

Many of the exemplary embodiments described above are discussed from the direction of handing off from a LTE RAN/SAE CN 300 to a GSM mobile network 100, however in general these exemplary embodiments can be reversed to work in the other direction. It is to be understood that one skilled in the art would be able to perform the reverse handoff, and hence it will not be fully described in detail in this specification, but nonetheless is contemplated to be within the scope of this specification. It is also to be understood that the exemplary embodiments described herein are not meant to limit the scope of the invention only to interworking between an LTE RAN/SAE CN and GSM mobile network 100, but that similar embodiments are valid for other cases, such as, for example, interworking between a Universal Mobile Telecommunication System (UMTS) and GSM mobile network 100.

The foregoing exemplary embodiments also have application outside of the context of handoff. For example, according to another exemplary embodiment, using the above described systems and methods a VoIP/IMS call can be originated from the MS 102 while the MS 102 is within a 2G RAN, e.g., a GSM network. For example, the 2G-SGSN 112 realizes from the PDP context activation request received from BSS 104 for MS 102 that the MS 102 is activating the PDP context for a VoIP/IMS call. Thus CS bearer(s), e.g., the voice TCH described above, can be allocated for the connection with MS 102 instead of the PS resources in the BSC within BSS 104. This then allows the 2G-SGSN 112 call setup process either by using the handover procedures or an assignment procedure over the A-interface 802 to reserve resources instead of using the BSS packet flow context creation procedures.

Figure 11:
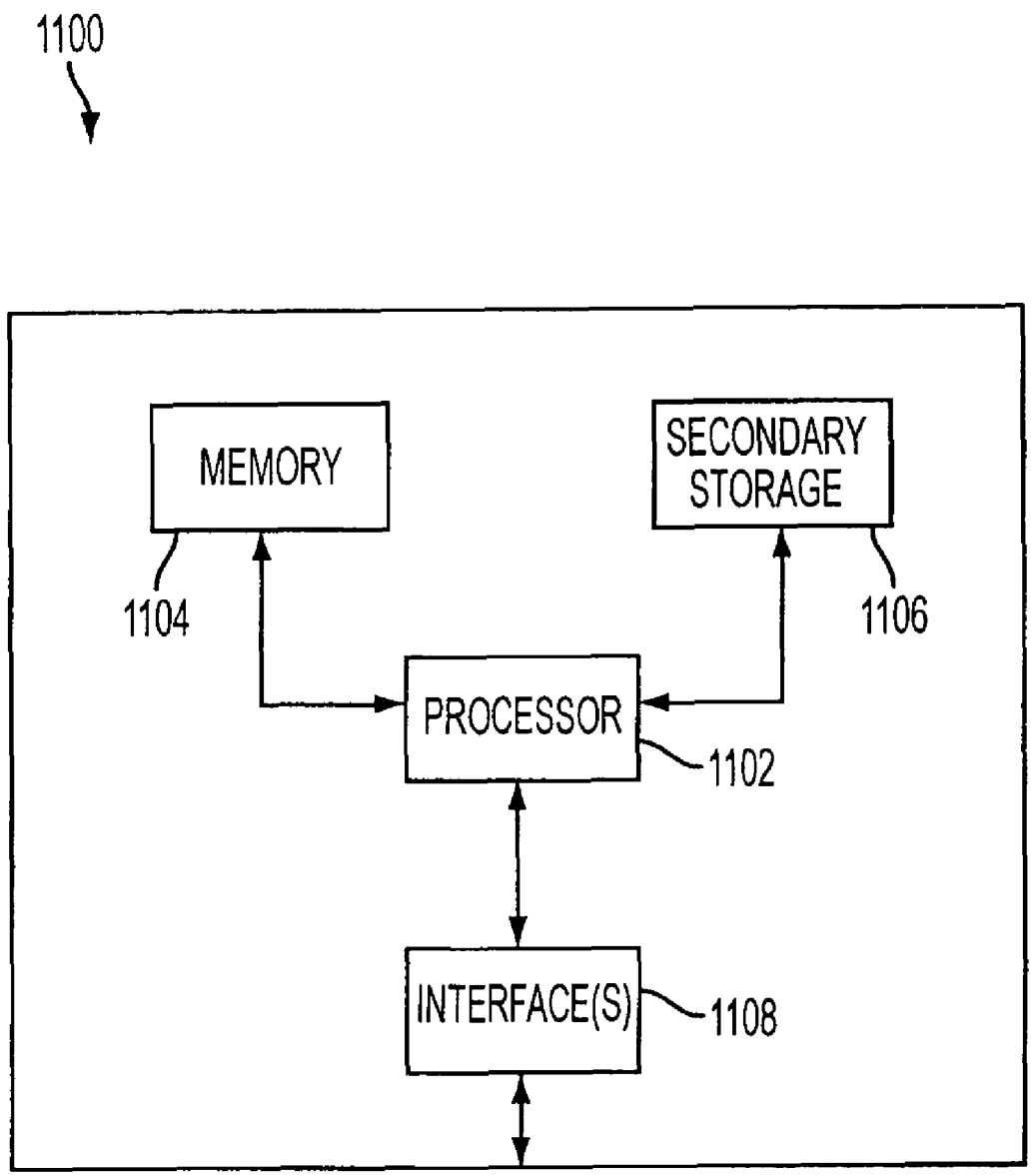
FIG. 11 shows a communications node according to exemplary embodiments.

The exemplary embodiments described above provide for the handoff of an MS 102 between a 2G RAN and a LTE RAN. An exemplary communications node 1100 which can be used, for example, to implement the 2G-SGSN 112 described above, will now be described with respect to FIG. 11. Node 1100 can contain a processor 1102 (or multiple processor cores), memory 1104, one or more secondary storage devices 1106 and an interface unit 1108 to facilitate communications between node 1100 and the rest of the network. Additionally, the node 1100 can include an A interface for CS handoff signaling. Alternatively, the node 1100 can include an A-interface which can also be used for CS handoff signaling with another node that has an A-interface. Thus, a network node according to an exemplary embodiment may include a processor(s) and an interface(s) for transmitting and receiving messages associated with the handoff of the MS 102 between a LTE RAN and a 2G RAN in both directions.

Figure 12:
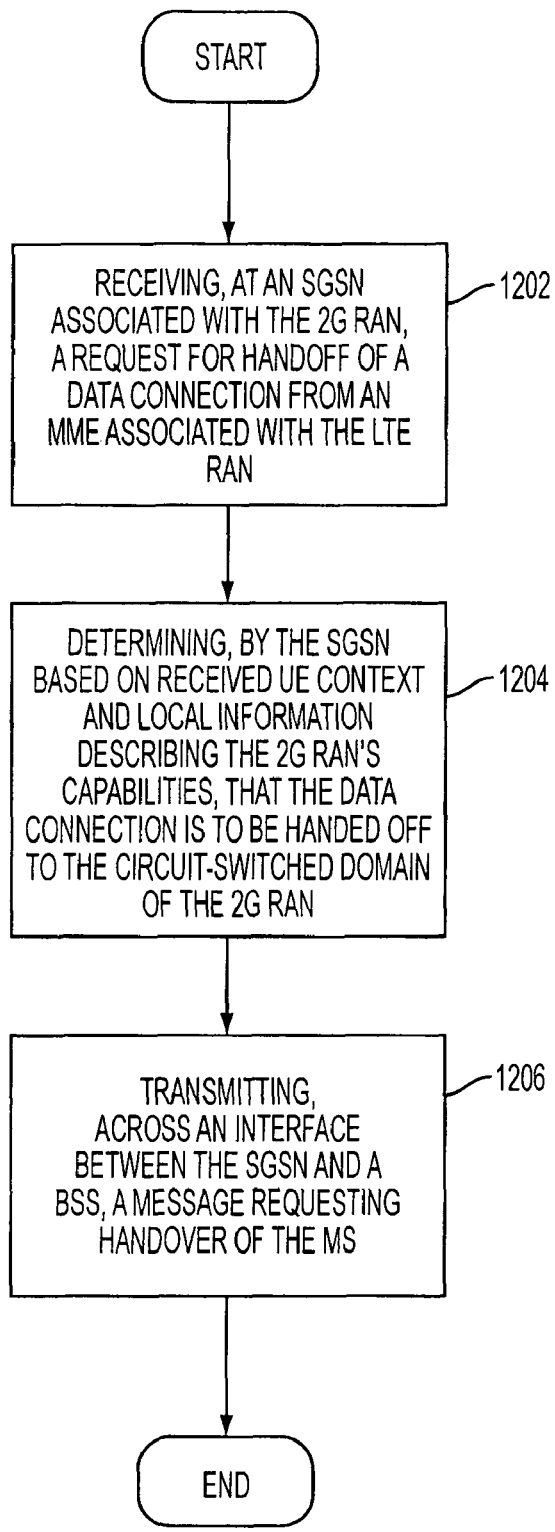
FIG. 12 shows a method flowchart for performing an inter-system handoff according to exemplary embodiments.

Utilizing the above-described exemplary systems according to exemplary embodiments, a method for communicating information associated with a handoff of mobile station equipment is shown in the flowchart of FIG. 12. Initially a method for communicating information associated with handoff of mobile system equipment (MS) from a long term evolution (LTE) radio access network (RAN) to a second generation RAN includes: receiving, at a Serving Global Packet Radio Service Support Node (SGSN) associated with the second generation RAN, a request for handoff of a data connection from a mobility management entity (MME) associated with the LTE RAN at step 1202; determining, by the SGSN based on the user equipment (UE) context received and local information describing the 2G RAN's capabilities, that the data connection is to be handed off to the circuit-switched domain of the second generation RAN at step 1204; and transmitting, across an interface between the SGSN and a Base Station Subsystem (BSS), a message requesting preparation for handover of the MS at step 1206.

Figure 13:
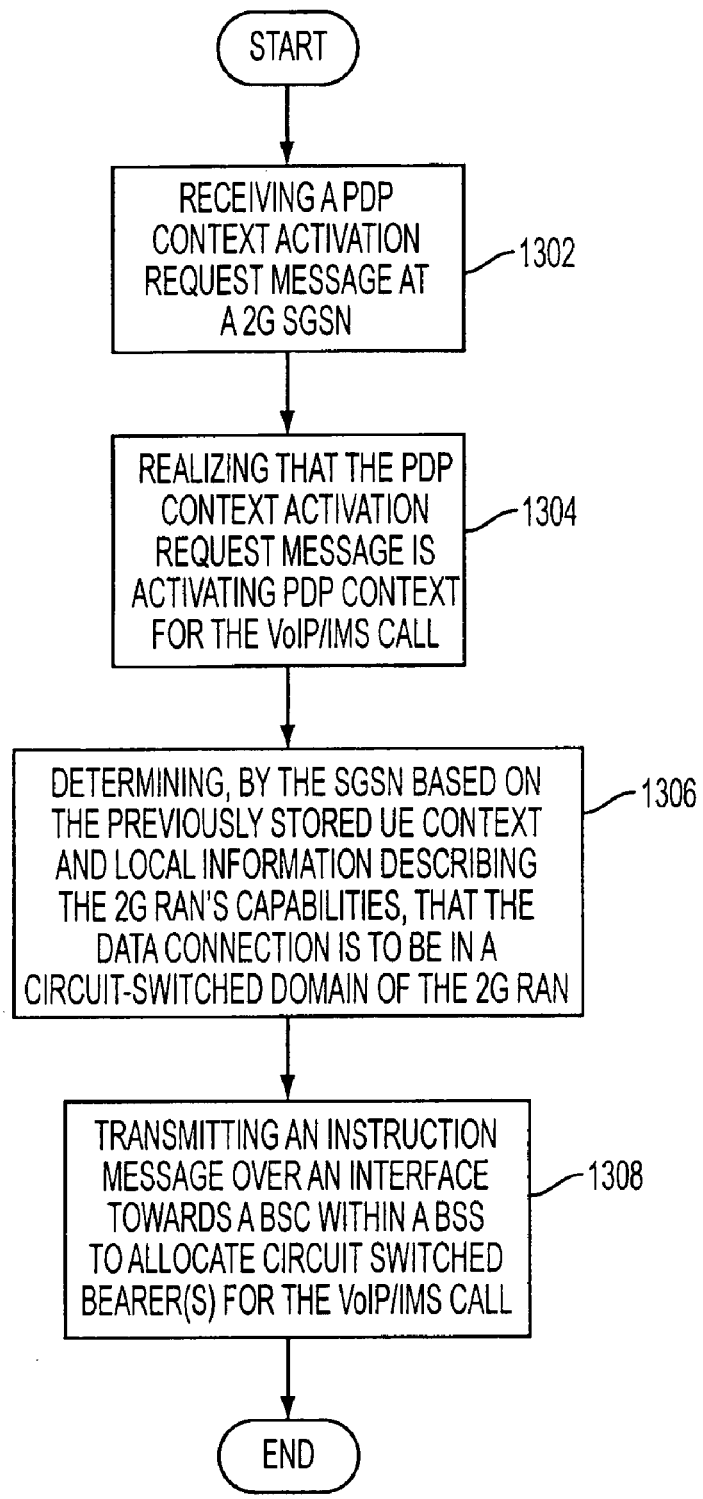
FIG. 13 shows a method flowchart for initiating a Voice over IP (VoIP)/IP Multimedia Subsystem (IMS) call from a mobile system while in a 2G RAN according to exemplary embodiments.

Utilizing the above-described exemplary systems according to exemplary embodiments, a method for initiating a VoIP/IMS call from mobile station equipment when operating within a 2G RAN is shown in the flowchart of FIG. 13. Initially a method for initiating a Voice over Internet Protocol (VoIP)/IP Multimedia Subsystem (IMS) call from a mobile system (MS) communicating through a second generation (2G) radio access network (RAN) includes: receiving a packet data protocol (PDP) context activation request message at a 2G serving general packet radio service (GPRS) support node (SGSN) at step 1302; realizing that the PDP context activation request message is activating PDP context for the VoIP/IMS call at step 1304; determining, by the SGSN based on the previously stored user equipment (UE) context and local information describing the 2G RAN's capabilities, that the data connection is to be in a circuit-switched domain of the second generation RAN at step 1306; and transmitting an instruction message over an interface towards a base station controller (BSC) within a base station subsystem (BSS) to allocate circuit switched bearer(s) for the VoIP/IMS call at step 1308.

Various other aspects regarding these exemplary embodiments will also be appreciated by those skilled in the art. For example, as regards the exemplary handover embodiments described above, the SGSN typically has no knowledge of the UE before being contacted by the MME and, thus, all information about the UE context is received from the MME. In this case the UE context will typically also include information about the PDP contexts already established in the LTE/SAE. On the other hand, for those exemplary embodiments associated with PDP Context activation, the situation is little bit different. The MS is already attached to the SGSN and the SGSN holds UE context that was stored as part of the initial attachment. So perhaps the most significant information in this case is the contents of the PDP Context Activation request message and the local information about the 2G RAN's capabilities. In addition, and optionally, the SGSN may also use information about the stored UE context in determining that CS resources should be used instead. The UE context may include information for example about the UE's capabilities.

The above-described exemplary embodiments are intended to be illustrative in all respects, rather than restrictive, of the present invention. All such variations and modifications are considered to be within the scope and spirit of the present invention as defined by the following claims. For example, both, or either, the A interface 402 and the A-interface 802 can be used interchangeably or in conjunction with each other with only minor (or no) changes required for the various exemplary embodiments described above. Additionally, instead of using an AMR codec for transporting data, transporting data using a GSM Enhanced Full Rate (EFR) codec over a voice TCH could be used. No element, act, or instruction used in the description of the present application should be construed as critical or essential to the invention unless explicitly described as such. Also, as used herein, the article "a" is intended to include one or more items.

What is claimed is:

1. A method for communicating information associated with handoff of mobile station equipment (MS) from a long term evolution (LTE) radio access network (RAN) to a circuit-switched domain of a second generation (2G) RAN comprising:
receiving, at a Serving Global Packet Radio Service Support Node (SGSN) associated with said second generation RAN, a request for handoff of a data connection from a mobility management entity (MME) associated with said LTE RAN;
determining, by said SGSN based on received user equipment (UE) context and local information describing said 2G RAN's capabilities, that said data connection is to be handed off to said circuit-switched domain of said 2G RAN; and transmitting, across an interface between said SGSN and a Base Station Subsystem (BSS), a message requesting resources for handover of said MS.

2. The method of claim 1, further comprising:
receiving, at said SGSN in response to said message, a handover request acknowledgement message which includes a Global System for Mobile communications (GSM) radio resources (RR) handover command; and
forwarding, from said SGSN, said GSM RR handover command toward said MME.

3. The method of claim 2, wherein said GSM RR handover command includes information about a traffic channel which has been reserved for said data connection.

4. The method of claim 2, wherein said SGSN selects a ciphering algorithm and an identifier associated with said ciphering algorithm to be used is transmitted to said BSS which then adds said ciphering algorithm and said identifier associated with said ciphering algorithm to be used within said GSM RR handover command that is sent to said MS.

5. The method of claim 1, wherein said interface is an A interface and said message requesting handover of said MS to said BSS includes a request for a traffic channel (TCH) to be used for said data connection handoff.

6. The method of claim 5, wherein said TCH is a transparent sixteen kpbs TCH.

7. The method of claim 5, wherein said TCH is a voice TCH.

8. The method of claim 7, further comprising:
transporting data using an adaptive multi-rate (AMR) codec over said voice TCH.

9. The method of claim 8, wherein said step of transporting data using an AMR codec over said voice TCH further comprises:
compressing the IP header; and
transporting an AMR frame to a multiplexor and scheduling said AMR frame for transmission.

10. The method of claim 9, wherein the AMR frame carrying the data is indicated with one of the spare values for AMR frame type.

11. The method of claim 7, further comprising:
transporting data using a GSM Enhanced Full Rate (EFR) codec over said voice TCH.

12. The method of claim 1, wherein said data connection is a Voice over Internet Protocol (VoIP) using an IP Multimedia Subsystem (IMS) call.

13. The method of claim 1, wherein an authorization procedure is used to provide said MS with indication of a selected ciphering key initially created for packet-switched (PS) bearers, wherein a circuit-switched (CS) bearer uses said same selected ciphering key and a selected ciphering algorithm to be used.

14. The method of claim 1, wherein said interface is a modified version of an A interface and said SGSN separates voice flows from non-voice flows.

15. The method of claim 14, wherein after completion of said handoff, said method further comprises:
using link access protocol on a modified D (LAPDm) channel as a link layer protocol at said BSS;
transmitting voice on a TCH; and
transmitting data on a forward access channel (FACH) when there are no voice samples to transmit.

16. The method of claim 15, further comprising:
transmitting IP Multimedia Subsystem signaling in a compressed mode on a scheduled access channel (SACH).

17. A system for communicating information associated with handoff of mobile system equipment (MS) from a long term evolution (LTE) radio access network (RAN) to a second generation RAN comprising:
a Serving Global Packet Radio Service Support Node (SGSN) associated with said second generation RAN, which receives a request for handoff of a data connection from a mobility management entity (MME) associated with said LTE RAN, determines, based on received user equipment (UE) context and local information describing said 2G RAN's capabilities, that said data connection is to be handed off to said circuit-switched domain of said 2G RAN, and transmits a message requesting handover of said MS is transmitted across an interface between said SGSN and a Base Station Subsystem (BSS).

18. The system of claim 17, wherein said SGSN in response to said message receives a handover request acknowledgement message which includes a Global System for Mobile communications (GSM) RR handover command, further wherein said SGSN forwards said GSM RR handover command toward said MME.

19. The system of claim 18, wherein said GSM RR handover command includes information about a traffic channel which has been reserved for said data connection.

20. The system of claim 18, wherein said SGSN selects a ciphering algorithm and an identifier associated with said ciphering algorithm to be used is transmitted to said BSS which then adds said ciphering algorithm and said identifier associated with said ciphering algorithm to be used within said GSM relocation RR command that is sent to said MS.

21. The system of claim 17, wherein said interface is an A interface and said message requesting handover of said MS to said BSS includes a request for a traffic channel (TCH) to be used for said data connection handoff.

22. The system of claim 21, wherein said TCH is a transparent sixteen kpbs TCH.

23. The system of claim 21, wherein said TCH is a voice TCH.

24. The system of claim 23, wherein data is transported using an adaptive multi-rate (AMR) codec over said voice TCH.

25. The system of claim 24, wherein when said data is transported using an AMR codec over said voice TCH further comprises:
 compressing IP header; and
 transporting an AMR frame to a multiplexor and scheduling said AMR frame for transmission.

26. The system of claim 17, wherein said data connection is a Voice over Internet Protocol (VoIP) using an Internet Multimedia Subsystem (IMS) call.

27. The system of claim 17, wherein an authorization procedure is used to provide said MS with indication of a selected ciphering key initially created for packet-switched (PS) bearers, wherein a circuit-switched (CS) bearer uses said same selected ciphering key and a selected ciphering algorithm to be used.

28. The system of claim 17, wherein said interface is a modified version of an A interface and said SGSN separates voice flows from non-voice flows.

29. The system of claim 28, wherein after completion of said handoff, said system further comprises:
 a link access protocol on a modified D (LAPDm) channel used as a link layer protocol at said BSS;
 voice is transmitted on a TCH; and
 data is transmitted on a forward access channel (FACH) when there are no voice samples to transmit.

30. The system of claim 29, wherein IP Multimedia Subsystem signaling in a compressed mode is transmitted on a scheduled access channel (SACH).

\* \* \* \* \*

UNITED STATES PATENT AND TRADEMARK OFFICE
CERTIFICATE OF CORRECTION

PATENT NO. : 8,391,241 B2
APPLICATION NO. : 12/680300
DATED : March 5, 2013
INVENTOR(S) : Vikberg et al.

Page 1 of 1

It is certified that error appears in the above-identified patent and that said Letters Patent is hereby corrected as shown below:

In the Specification

In Column 5, Line 39, delete "MME 306" and insert -- MME 304 --, therefor.

Signed and Sealed this
Eleventh Day of June, 2013

Teresa Stanek Rea
*Acting Director of the United States Patent and Trademark Office*